United States Patent

Barber et al.

[11] Patent Number: 5,800,188
[45] Date of Patent: Sep. 1, 1998

[54] DIRECT CONNECT TRAILER TOW INTERCONNECTOR

[75] Inventors: Benjamin A. Barber, Needham; Kayvan Heydayat, Chestnut Hill, both of Mass.

[73] Assignee: Joseph Pollak Corporation, Boston, Mass.

[21] Appl. No.: 599,577

[22] Filed: Feb. 9, 1996

[51] Int. Cl.⁶ .................................................. H01R 13/447
[52] U.S. Cl. ..................... 439/142; 439/35; 439/206; 439/651; 220/242
[58] Field of Search .............................. 439/142, 144, 439/206, 205, 34, 35, 271, 655, 638, 650, 651, 653, 654; 220/334, 242; 16/305, 307, 362, 361

[56] References Cited

U.S. PATENT DOCUMENTS

| | | | |
|---|---|---|---|
| 452,685 | 5/1891 | Webster | 16/307 |
| 824,578 | 6/1906 | Patten | 16/361 |
| 3,494,657 | 2/1970 | Tantlinger et al. | 296/28 |
| 3,601,660 | 8/1971 | Brandt | 317/99 |
| 3,859,807 | 1/1975 | Van Raden | 280/422 |
| 4,245,875 | 1/1981 | Shaffer et al. | 439/144 |
| 4,456,145 | 6/1984 | Frank | 439/142 |
| 4,460,811 | 7/1984 | Murr et al. | 200/51.03 |
| 4,765,523 | 8/1988 | Ferguson | 16/361 |
| 4,793,819 | 12/1988 | Berg | 439/205 |
| 5,382,171 | 1/1995 | Hofmann et al. | 439/35 |
| 5,385,476 | 1/1995 | Jasper | 439/35 |
| 5,407,219 | 4/1995 | Chiu | 280/422 |
| 5,443,389 | 8/1995 | Hughes | 439/35 |
| 5,514,009 | 5/1996 | Hughes | 439/35 |
| 5,571,023 | 11/1996 | Anthony | 439/142 |

FOREIGN PATENT DOCUMENTS 0324510  7/1989  European Pat. Off. ........... 439/142

*Primary Examiner*—Gary F. Paumen
*Assistant Examiner*—Tho D. Ta
*Attorney, Agent, or Firm*—Kenway & Crowley

[57] ABSTRACT

A direct-connect trailer tow interconnector for connecting the electrical circuits of a tow vehicle with similar circuits of a trailer in which a one-piece shell socket accepts a standard trailer plug at one end and is compatible with the fitting of a tow vehicle harness at the other end. Pass-through conductors, each of which is made from a single metal blank, form terminals compatible with those of the trailer plug and also with those of the vehicle harness fitting. A cover is provided with a spring-loaded floating hinge to permit flat sealing protecting the interconnector from environmental hazards, and a flushing passage is formed through the cover to remove debris from the floating hinge.

1 Claim, 5 Drawing Sheets

DIRECT CONNECT TRAILER TOW INTERCONNECTOR

This invention relates in general to the interconnection of electrical circuits of a tow vehicle with similar circuits of a trailer and in particular to an interconnector which mates at its outer end with an industry standard trailer plug and at its inner end with a fitting having row pattern terminals.

BACKGROUND OF THE INVENTION

Conventionally, trailers are provided with plugs which are cylindrical in shape and have a central terminal surrounded by a number of perimeter terminals. A widely used plug is known as the 7-way plug, and it has a center terminal and six terminals arrayed in a hexagonal pattern about its perimeter. The terminals of the plug are wired to electric brakes, turn signals, running lights, brake lights, etc. of the trailer. An interconnector usually mounted on the rear bumper or hitch plate of the tow vehicle has a socket with suitable matching terminals to accept the trailer plug at its outer end.

Installation of the interconnector on the tow vehicle requires the stripping and fastening by screws of individual wires of the tow vehicle to the interconnector terminals. These are the wires which run to the ground, battery, turn signals, brake lights, etc. of the tow vehicle. Making the required connections has proven to be costly, time-consuming and prone to miswiring because of installer error. To avoid these problems, the manufacturers of tow vehicles have sometimes made it a practice to install in-line connector fittings in the electrical harness adjacent the rear of the tow vehicle. These in-line connector fittings are usually a set of male and female 7-way connectors having their terminals in a double row pattern in a generally rectangular shell.

This makes for a rather complex structure having numerous parts and which presents difficult sealing problems. Also, the quality of performance and durability of the arrangement are less than desired.

SUMMARY OF THE INVENTION

The present invention improves upon the prior art by providing a one-piece shell which accepts a standard trailer plug at its outer end and a row-pattern connector at its inner end and which contains one-piece pass-through conductors, the outer ends of which constitute the terminals mating with those of the trailer plug and the inner ends of which constitute the terminals mating with those of the row-pattern connector. A hinged cover is provided for the interconnector, the hinge being of "floating" design spring-loaded to permit flat seating against environmental hazards and the cover having a flushing passage to clear road debris. The interconnector also has a drain slot to remove any accumulated moisture, the drain slot being shielded by a splash guard on the cover when the cover is closed.

For a better understanding of the present invention together with other and further features and advantages, reference should be made to the following description of a preferred embodiment which should be read with reference to the appended drawing in which:

DESCRIPTION OF PREFERRED EMBODIMENT

Figure 1:
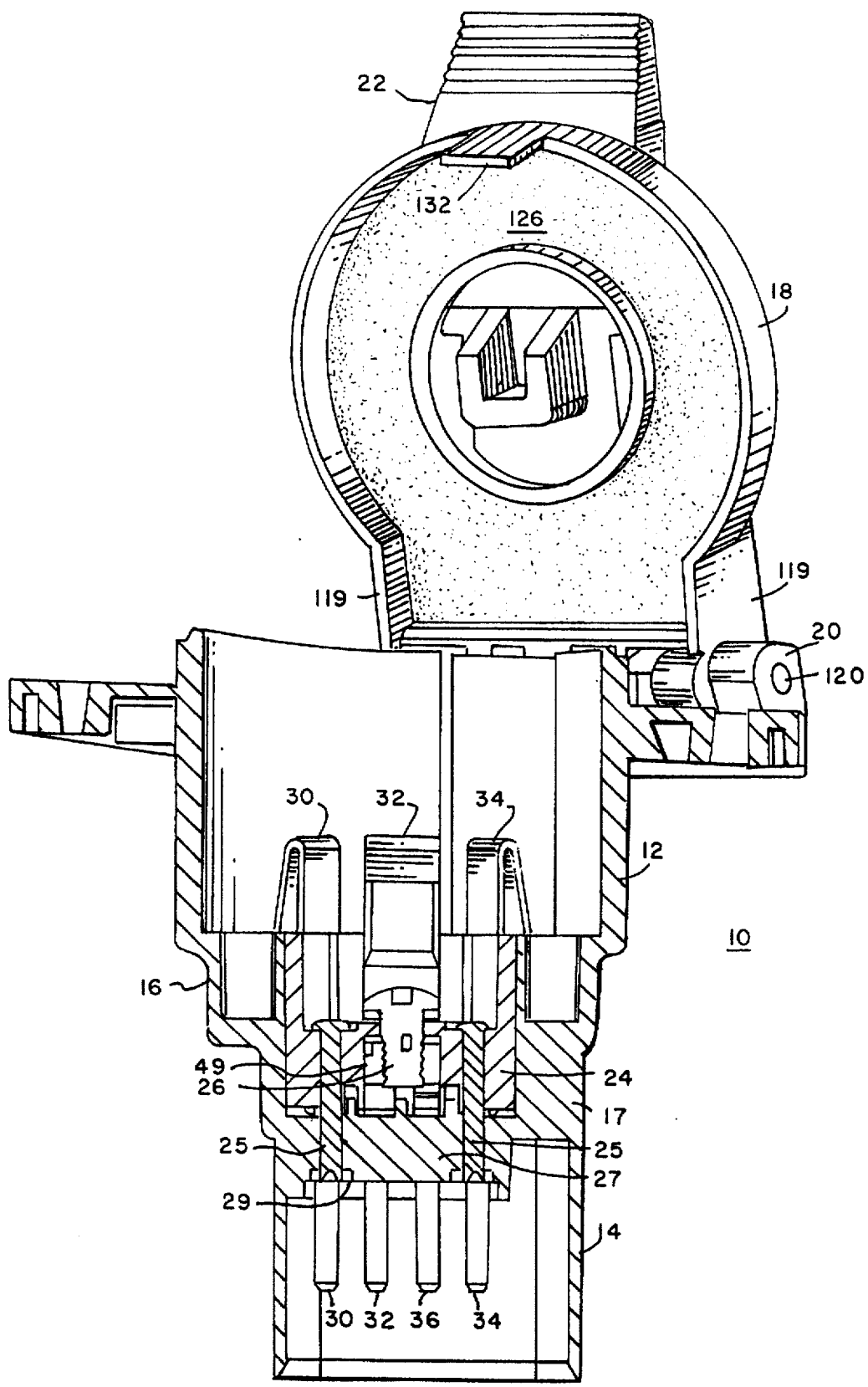
FIG. 1 is a sectional view of the socket shell and internal components of a preferred embodiment of the invention.
Figure 2:
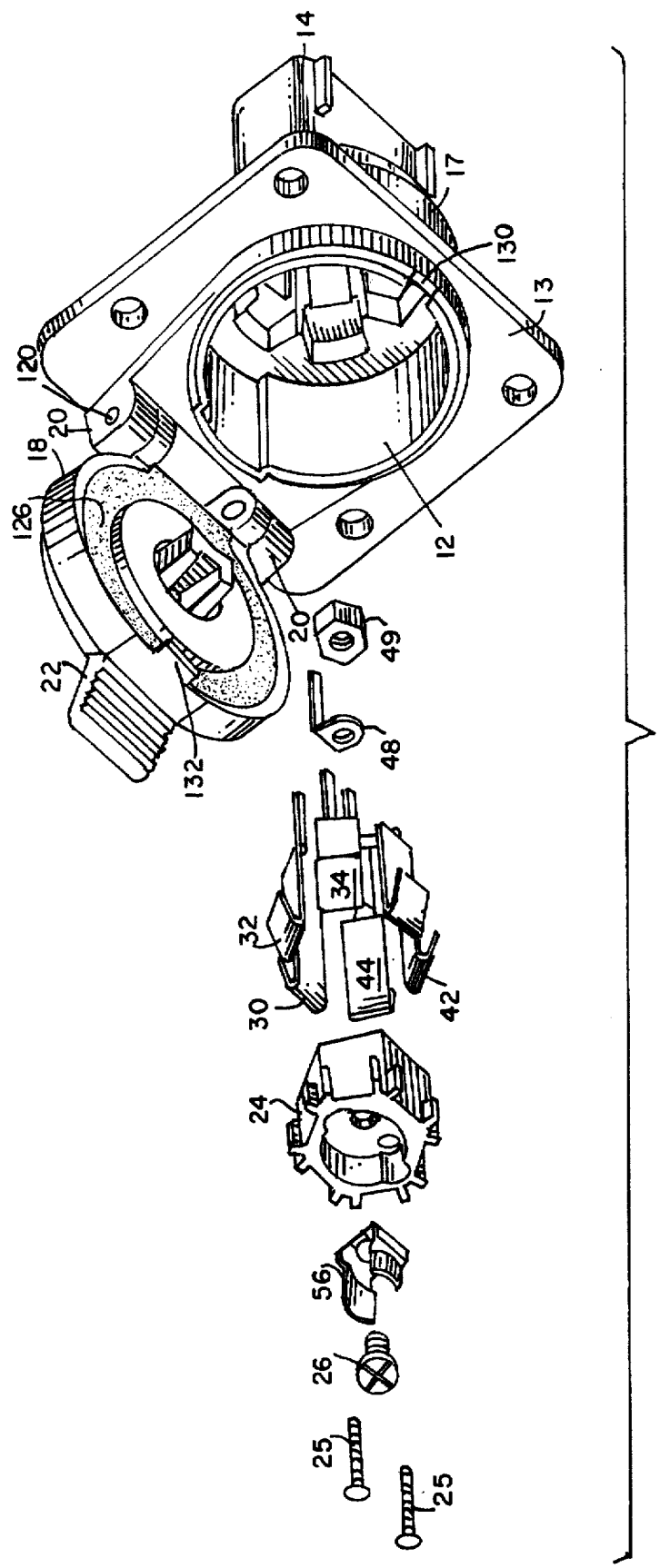
FIG. 2 is an exploded view of the embodiment of FIG. 1.

In the sectional view of FIG. 1 and the exploded view of FIG. 2, there may be seen a shell socket 10 made of durable insulating material such as glass-filled nylon. The socket includes a cylindrical section 12, a generally rectangular section 14, and transition sections 16 and 17. The cylindrical section 12 of the socket shell has a frame 13 to which a cover 18 is connected by a floating hinge 20. The design and purpose of the floating hinge are described in greater detail hereinafter. Extending outwardly from the top of the cover 18 is a finger-lift 22. As shown in detail hereinbelow, the sidewall of the cover 18 may also have a downwardly extending tongue 132 at a central area beneath the finger-lift 22, which serves as a splash guard.

A sub-assembly of parts is formed about an insulating spacer block 24 of hexagonal cross-section which is held by rivets 25 firmly against the top of a partition 27 formed in the shell near the bottom of the transition section 17. This sub-assembly, as is more clearly shown in the exploded view of FIG. 2, includes a screw 26 which passes through a U-shaped terminal 56 and thence through the spacer block 24 and the eye of a ground conductor 48. A hex nut 49 is threaded on the screw 26 to hold the sub-assembly together.

The spacer block 24 has slots formed along the length of each of its six sides. These slots accommodate flat portions of six pass-through conductors 30, 32, 34, 40, 42, and 44. Each of these pass-through conductors is made from a single metal blank and is bent back upon itself as shown to form blade-style terminals in the cylindrical section to accommodate terminals of a trailer plug.

In the exploded view of FIG. 2, only part of the exterior of the rectangular section 14 is visible. Conversely, only a part of the interior of the cylindrical section 12 may be seen. The top of partition 27 formed at the bottom of the transition section 17 is partly visible, and in it a series of openings are formed. Several of these openings are visible in FIGS. 1 and 2, and these accommodate the conductors 30, 32, and 34; the rivets 25 and the remaining perimeter conductors 40, 42 and 44. A seventh conductor opening is formed in the partition 27 adjacent the center of the cylindrical section, and it accommodates the conductor 36 which is held in place by the screw 26 and hex nut 49. When the parts are assembled as shown in other views, the seven pass-through conductors emerge in the rectangular section 14 in a double row pattern. The insulating spacer block holds the various pass-through conductors in place while the spacer block 24 itself is held in position by the rivets 25. A sealant layer 29, which may be of silicone, is deposited in the well which is formed about the emerging pass-through conductors.

In order to make the transition from six hexagonally arranged blade conductors to a double row pattern of rectangularly disposed terminals, each of the conductors being formed from a single blank, a symmetrical arrangement is employed permitting three tools to produce two terminals from each tool for a total of six. The six terminals in the rectangular tow vehicle end are aligned in a double row pattern which also includes the conductor.

Figure 3A:
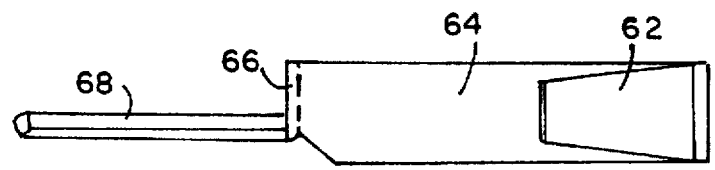
FIG. 3(a)–3(c) are views of the one-piece pass-through conductors of the invention.

In FIG. 3(a) there may be seen the first type of pass-through conductor apart from the assembly. A single blank is stamped and subjected to a series of complex bends forming the blade-style trailer terminal end 62 bent back upon itself, a straight section 64 to engage a slot in the spacer block 24, an offset bend 66 and an inner tow vehicle end terminal 68.

Figure 3B:
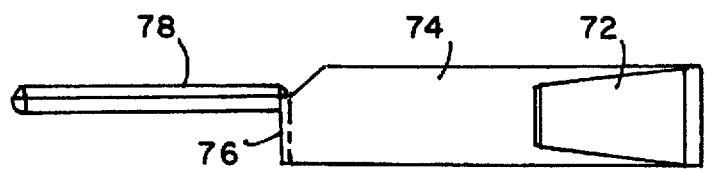

In FIG. 3(b) the second type of pass-through conductor is shown. In much the same manner as the conductor of 3(a), it is stamped from a single blank and subjected to complex bending. The end 72 is identical to the end 62 and the straight section 74 is identical to the section 64. The offset bend 76 is in a direction opposite to the offset 66, but the inner end terminal 78 is the same as the terminal 68.

Figure 3C:
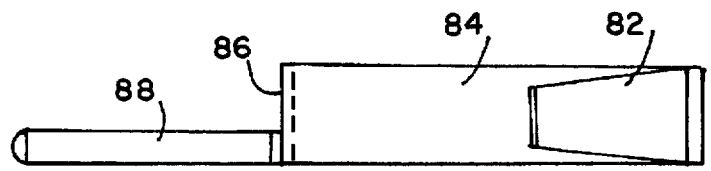

In FIG. 3(c) the third type of pass-through conductor is shown. Again, as with the conductors of FIGS. 3a and 3b, it is stamped from a single blank and subjected to complex bending. The end 82 is identical to the ends 62 and 72 of the comparable conductors and the straight section 84 is similarly identical to the sections 64 and 74. Finally, the offset bend 86 is at a different angle than those of the offset bends 66 and 76, but the inner end terminal 88 is entirely similar to the tow vehicle inner end terminals 68 and 78.

Figure 4:
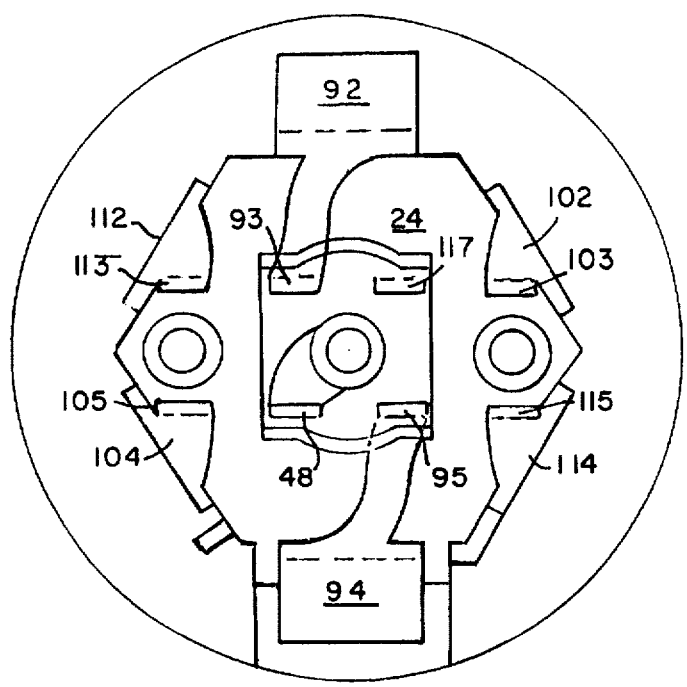
FIG. 4 is a cross-section of the connector illustrating the disposition and shape of the pass-through conductors.

In FIG. 4, a cross-sectional view from the end of the spacer block 24 shows the assembled pass-through conductors. It will be noted that the conductors 92 and 94 at opposite sides of the spacer block 24 are identical, their extensions forming rectangular terminals 93 and 95 at the tow vehicle end. Similarly, the blade terminals 102 and 104 at opposite sides of the spacer block 24 are extended to form the tow vehicle row pattern terminals 103 and 105. The last pair of conductors 112 and 114 have their ends formed into tow vehicle terminals 113 and 115. The central terminal 36 is extended from the assembly shown in FIG. 2. It will be noted that the central terminal and the six perimeter terminals from the trailer end constitute seven of the eight row-pattern terminals at the tow vehicle end, the terminal 117 being a blank.

Figure 6:
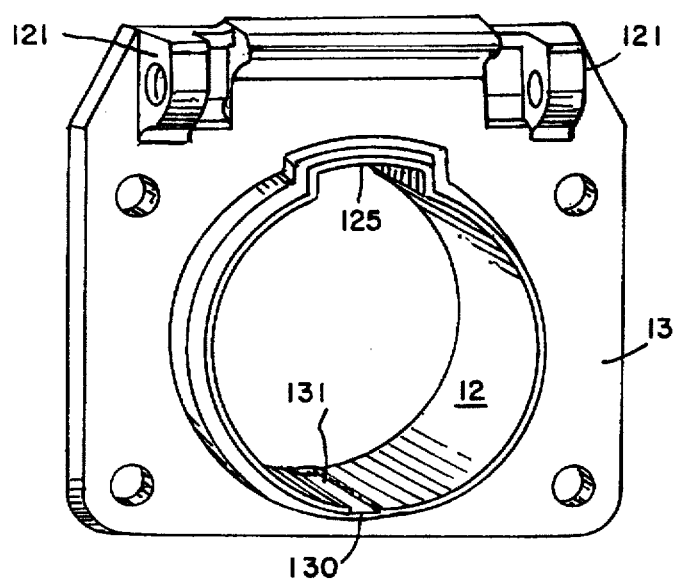
FIG. 6 is a perspective view of the frame showing detail of the drain slot and hinge mount.
Figure 5:
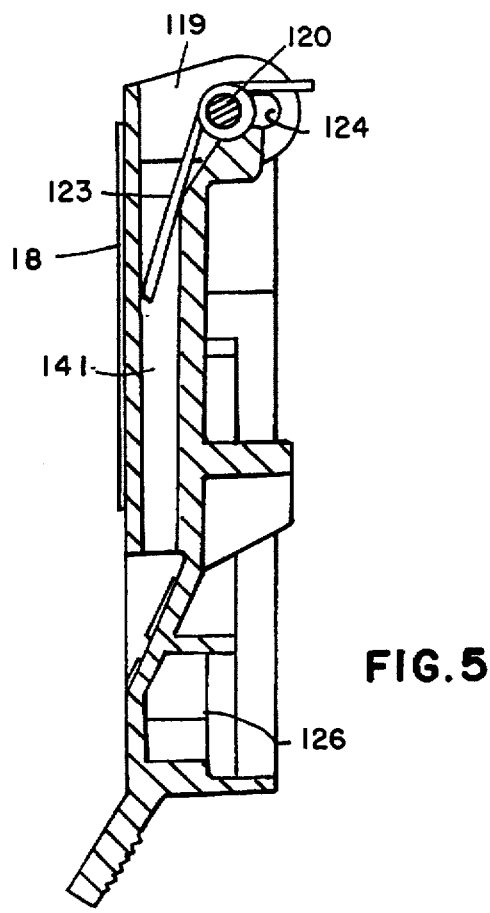
FIG. 5 is a side view in section of the cover, showing the floating hinge, the flushing passage and torsion spring.

Some detail on the floating hinge 20 and drain system is visible in both FIGS. 5 and 6. It may be seen that lugs 119, which are extensions of the cover 18, are pivotably mounted on a pin 120 which is held in brackets 121 integral with the frame 13 which surrounds the cylindrical section 12. Two generally elliptical openings 124 are formed in the lugs 119 as shown in FIG. 5. The combination of the elliptical openings 124 and the cylindrical pin 120 constitutes a floating hinge. The cover 18 is provided with a gasket 126 which may be made of rubber or other yielding material. The cover 18 is spring-biased by a torsion spring 123 wound about the pin 120 and bearing on the wall of a vertical passage 141 formed through the cover and applied at the diametrical center of that cover. The spring 123 urges the cover toward a closed position in which it seats on the end of the cylindrical section 12. When the cover is lifted upwardly, the floating hinge permits it to pivot on a shifting axis as the elliptical opening moves relative to the pin 120. When the cover is closed, the shifting pivot axis permits the cover to seat flatly on the end of the cylindrical section 12 under the pressure of the torsion spring 123. The gasket 126 is subjected to uniform pressure about its periphery to form a cover-to-socket face seal and thus protects the internal components from the environment.

The socket shell section 12 is also provided with a drain slot 130 which is at the bottom of the connector when it is installed on a tow vehicle. The installation is made with the keyway 125 for the trailer plug oriented at the top of the connector so that the drain slot 130 is at the bottom of the connector. The cylindrical section 12 is attached to the vertical frame 13 at a downward angle from partition 27 to drain slot 130. Additionally, a sloping drain way 131 is cut in the inner wall of the cylindrical section 12. Both features provide a downward angle to channel fluid which may accumulate out of the connector through the slot 130.

Figure 7:
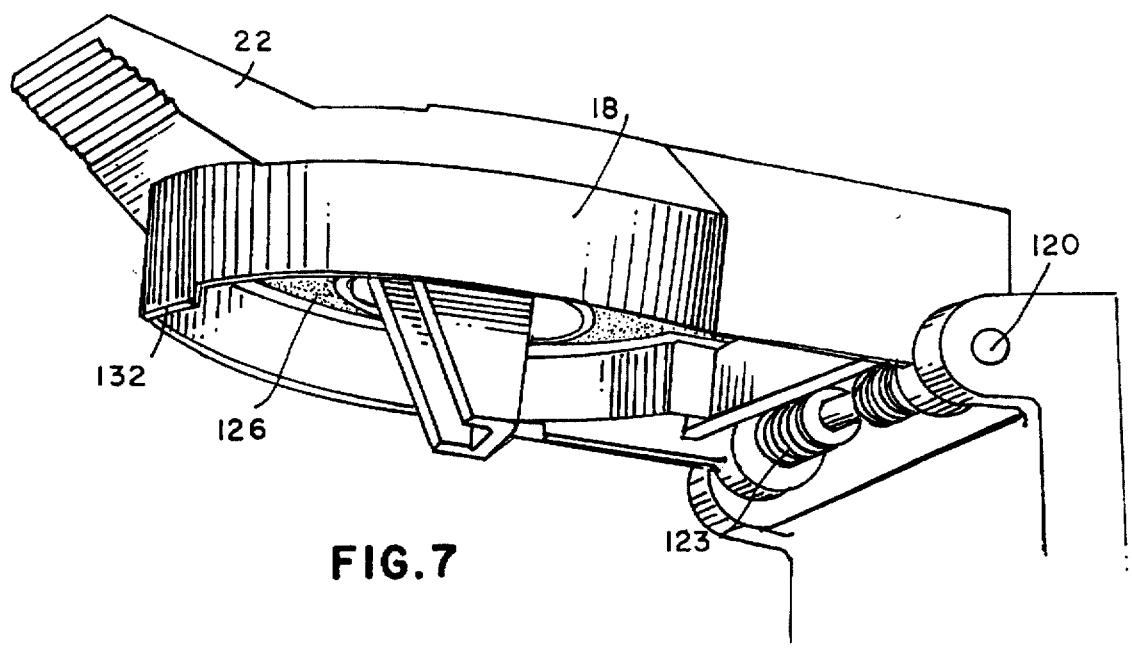
FIG. 7 is a perspective view of the connector cover.

FIG. 7 is a perspective view of a preferred form of cover. The cover includes a passage 141 which is vertical when the interconnector is mounted and oriented as shown in FIG. 5 with the keyway 125 at the top of the structure. Debris from road spatter and other contaminants which might interfere with operation of the hinge 20 and torsion spring 123 are flushed through the cover by rain. The cover passage 141 is enclosed on the top side of the cover. The top side enclosure provides a large flat continuous surface upon which the text and graphics may be applied for such purposes as part number identification, corporate logo, and circuit wiring diagram information. Another feature of the cover is the splash guard 132 which covers the end of the drain slot 130 when the connector is not in use and the cover is in a closed position.

What is claimed is:

1. An interconnector for the electrical connection of a wiring harness connector fitting of a tow vehicle to the connector plug of a trailer comprising a socket shell of insulating material having a first generally cylindrical end, a second generally rectangular end and a transition section between said ends, an insulating spacer core disposed in said shell, a plurality of pass-through conductors fixed in said insulating core, each of said pass-through conductors being formed of a single piece of metal, said plurality of conductors being arranged in a hexagonal pattern adjacent said first end about a central conductor to accommodate said trailer plug and being arranged adjacent said second end in a double row pattern of terminals to accommodate said wiring harness fitting.

* * * * *

UNITED STATES PATENT AND TRADEMARK OFFICE
CERTIFICATE OF CORRECTION

PATENT NO. : 5,800,188
DATED : September 1, 1998
INVENTOR(S) : Benjamin A. Barber, Kayvan Hedayat It is certified that error appears in the above-identified patent and that said Letters Patent are hereby corrected as shown below:

On the title page, Item [75], please correct the spelling of the name of the co-inventor from "Kayvan Heydayat" to --Kayvan Hedayat--.

Signed and Sealed this

First Day of December, 1998

*Attest:*

BRUCE LEHMAN

*Attesting Officer*  Commissioner of Patents and Trademarks